UNITED STATES PATENT OFFICE.

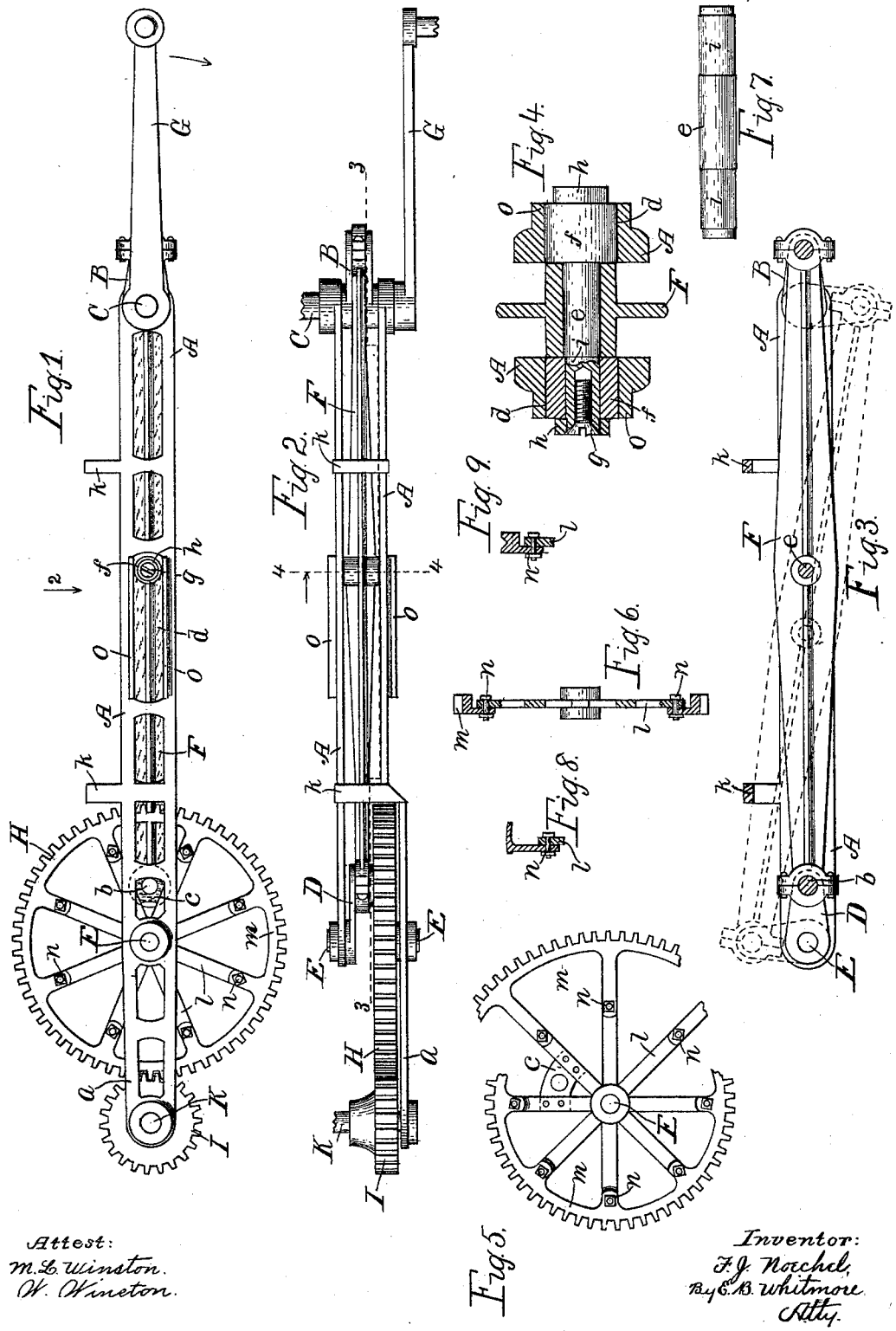

FRANK J. NOECHEL, OF ROCHESTER, NEW YORK, ASSIGNOR TO JOHN GEORGE WAGNER, JR., AND HERMAN S. SEARLE, OF SAME PLACE.

DEVICE FOR TRANSMITTING MOTION.

SPECIFICATION forming part of Letters Patent No. 592,436, dated October 26, 1897.

Application filed December 17, 1896. Serial No. 615,987. (No model.)

*To all whom it may concern:*

Be it known that I, FRANK J. NOECHEL, of Rochester, in the county of Monroe and State of New York, have invented a new and useful Improvement in Devices for Transmitting Motion, which improvement is fully set forth in the following specification and shown in the accompanying drawings.

My invention relates to devices for transmitting motion; and it consists in parts and devices useful, for instance, in the matter of propelling bicycles and other vehicles, all hereinafter fully described and more particularly pointed out in the claim.

Referring to the drawings, Figure 1 is a side elevation of my improved motion-transmitting device. Fig. 2 is a plan seen as indicated by arrow 2 in Fig. 1. Fig. 3 is a longitudinal section of the frame and other parts on the dotted line 3 3 in Fig. 2, parts being shown in various positions by full and dotted lines. Fig. 4 is a transverse section of the frame and other parts, taken on the dotted line 4 4 in Fig. 2. Figs. 5 and 6 show the manner of attaching rims of different diameters to the main driven axle. Fig. 7 shows the trunnion-pin of the pitman. Figs. 8 and 9 show different forms of the rim of the wheel. Figs. 4 and 7 are drawn to a scale much larger than that of the other figures.

Referring to the parts shown, A is a frame, preferably of steel, for holding the working parts of the device.

B is a double driving-crank held upon a divided axle C at one end of the frame.

D is a driven crank held upon a similar divided axle E at the opposite end of the frame.

F is a pitman connecting the two cranks B D.

The axle C with the crank B may be turned by any convenient means—as, for instance, by an operating-crank G.

Upon the axle E is placed a gear H, consisting of a wheel or spider formed with a hub and arms $l$ and an attached removable rim $m$. It is immaterial whether the rim is toothed, as shown, or whether it is formed flat at its periphery, as shown in Fig. 8, and adapted to carry a flat belt or band, or whether it is grooved for holding a round cord or cable, as shown in Fig. 9. By means of this wheel motion may be communicated to other mechanism or devices—as, for example, if the rim be toothed it may be made to turn a pinion I, held upon an axle K in an extended part $a$ of the frame. The pin $b$ of the crank D extends to have a bearing in a plate $c$, made rigid with the arms $l$ of the wheel or spider, on account of which the latter serves as a part of the crank D and is controlled by said crank. From this description it will be understood that by turning the crank G the gear H will be rotated.

The frame A is formed with opposing longitudinal slots $d\ d$, Figs. 1 and 4, midway of its length, and the pitman is provided at its middle point adjacent to said slots with a transverse trunnion-pin $e$, Fig. 7. The axis of this pin intersects at right angles the axis of the pitman, the pin projecting at its ends equally at either side of the pitman. The projecting parts $i\ i$ of the trunnion-pin at the sides of the pitman are provided with antifriction-rollers $f\ f$, adapted to roll along in the respective slots $d\ d$ while the pitman is moving, said slots forming guides or tracks for controlling said rollers and the middle part of the pitman. These rollers are held to place upon the trunnion-pin by means of screws $g$, threaded in the ends of the pin, washers or retaining-pieces $h$ being held by the screws to control the rollers.

The parts $i$ of the trunnion within the respective rollers are shown as being slightly less in diameter than the middle part or body of the trunnion; but this is not a matter of necessity, as the trunnion may be of uniform diameter within the two rollers and the pitman. The trunnion-pin extends at its two ends for a short distance into the respective washers for the purpose of centering the latter, the parts of the trunnion within said washers being reduced in diameter. On account of this form of the ends of the trunnion the washers will be drawn by the screws up against shoulders of the trunnion and so as not to pinch the rollers, but allow the latter to turn freely upon the trunnion. The trunnion-pin $e$ also acts as a fulcrum or pivot upon which the pitman turns or rocks as its ends are carried around in circles by the cranks.

The form of the frame A is not essential, its use being simply to hold the operating parts in place. If formed of two parts or sides, as shown, cross-ties $k\,k$ are employed to hold them together. The device, as shown, is more particularly adapted for use upon bicycles for the purpose of discarding the ordinary chain. When applied to this use, the pinion I is secured to the axle of the rear wheel, or directly to the wheel itself, so the latter may be propelled by pedal-cranks corresponding with G on the crank-axle C.

The rim $m$, whatever its form or kind, is secured to the outer ends of the arms $l$ by some simple means, as fastening-bolts $n$, the rim having inwardly-projecting arms to meet the arms $l$. When the device is used to propel a bicycle and it is wished to gear the latter at a high or low speed, rims of different diameters are employed, as shown in Fig. 5, secured to the arms of the spider—that is to say, for low speed a rim corresponding in diameter to the smaller one at the left in said figure is secured to the spider, a pinion of corresponding larger size being employed on the axle K. On the other hand, if it be wished to gear the vehicle for a higher speed a rim of larger diameter, a section of which is shown at the right in said figure, is secured to the spider, a corresponding smaller pinion being used on the axle K.

If in any case it is desirable, antifriction-balls may be introduced in the various bearings in the usual manner and for the usual purpose.

Horizontal ledges or ways $o\,o$, Figs. 1, 2, and 4, projecting at the sides of the frame adjacent to the sides of the slots $d\,d$, serve to broaden the surfaces of the tracks along which the rollers $f\,f$ travel when the pitman is operating.

What I claim as my invention is—

In a device for transmitting motion, the combination, with a frame, of a crank at each end thereof, a wheel at one end provided with a hub and spokes, a detachable rim secured to the spokes, a perforated plate upon the spokes, the pin of the crank at that end being connected with said plate, and a pitman having its ends connected with the cranks and the central portion movably connected with the frame, substantially as set forth.

In witness whereof I have hereunto set my hand, this 11th day of December, 1896, in the presence of two subscribing witnesses.

FRANK J. NOECHEL.

Witnesses:
ENOS B. WHITMORE,
M. L. WINSTON.